United States Patent [19]
Sutton et al.

[11] Patent Number: 5,082,403
[45] Date of Patent: Jan. 21, 1992

[54] CORE-DRILLING APPARATUS WITH MANDREL DRIVER-EJECTOR

[76] Inventors: James L. Sutton, 1610 Bay St.; Stephen H. Van Valkenburg, 2887 Hoover Ave. S.E., both of Port Orchard, Wash. 98366

[21] Appl. No.: 689,133

[22] Filed: Apr. 22, 1991

Related U.S. Application Data

[63] Continuation of Ser. No. 248,169, Sep. 23, 1988, abandoned.

[51] Int. Cl.⁵ .............................................. B23B 51/04
[52] U.S. Cl. .................................... 408/68; 408/209; 408/204; 408/703

[56] References Cited

U.S. PATENT DOCUMENTS

| | | | |
|---|---|---|---|
| 213,754 | 4/1879 | Jackson | 274/97 |
| 748,439 | 12/1903 | Twohig | 279/97 |
| 1,202,928 | 10/1916 | Wallace | 279/97 X |
| 1,378,290 | 5/1921 | Smith | 279/100 |
| 2,351,435 | 6/1944 | Kent | 408/204 X |
| 2,368,009 | 1/1945 | Drone | 405/237 X |
| 3,490,078 | 1/1970 | Perez, Jr. | 279/100 |
| 4,077,737 | 3/1978 | Morse | 144/23 X |
| 4,741,651 | 5/1988 | Despres | 408/204 X |

FOREIGN PATENT DOCUMENTS 137369 of 1902 Fed. Rep. of Germany ........ 279/97

*Primary Examiner*—Larry Schwartz
*Assistant Examiner*—Robert Schultz
*Attorney, Agent, or Firm*—Christopher Duffy

[57] ABSTRACT

In one embodiment, the bodies of the mandrel and the drill have radially opposing portions thereof which are threadedly engaged about the axis of the drill. Through bores in the respective body portions make it possible to latch the drill to the mandrel for the drilling operation, using a pin that is inserted through the bores, and then when the drilling operation is completed, withdrawn from the bores to enable the core of work material to be ejected from the drill by advancing the mandrel on the threading while the drill is restrained against rotation. In other embodiments, the bodies of the mandrel and the drill have axially opposing portions thereof which are equipped with raised steps on the axially opposing faces thereof. The steps enable the drill to be latched to the mandrel for the drilling operation by engaging the faces of the body portions with one another so that the steps abut in one axial plane of the drill. Afterward, the body portions are retracted from one another to enable the mandrel to be used in ejecting the core of the work material as described.

13 Claims, 6 Drawing Sheets

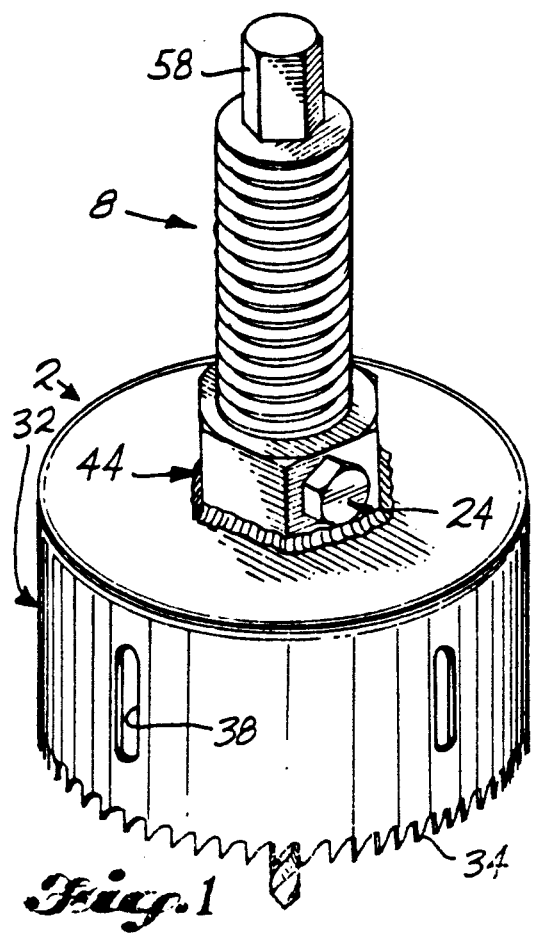
Fig.1
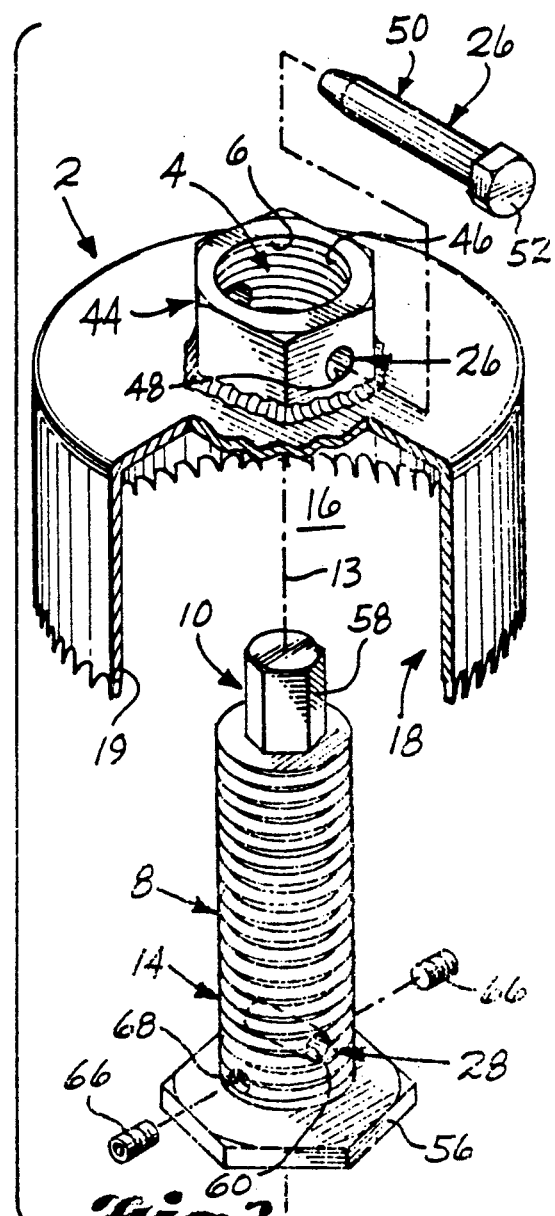
Fig.2
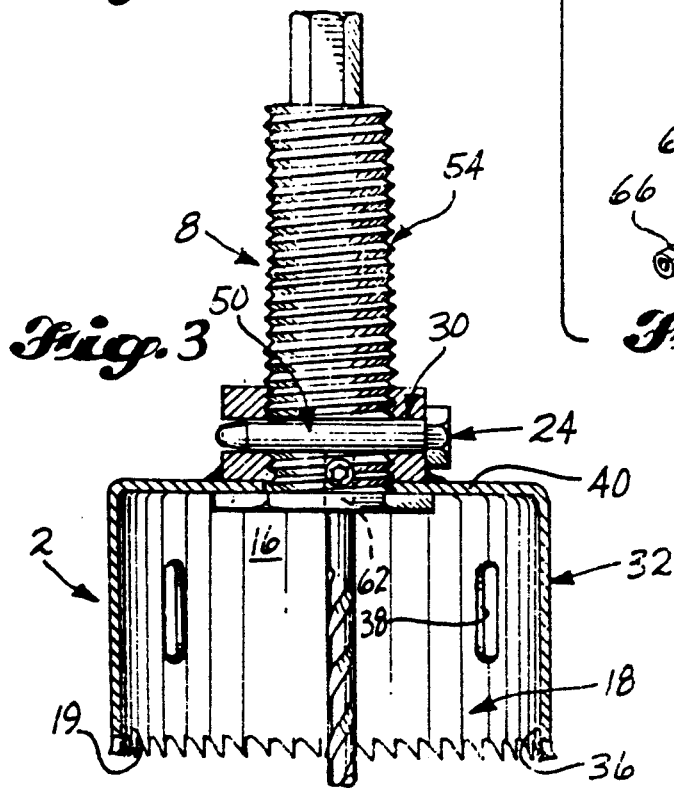
Fig.3

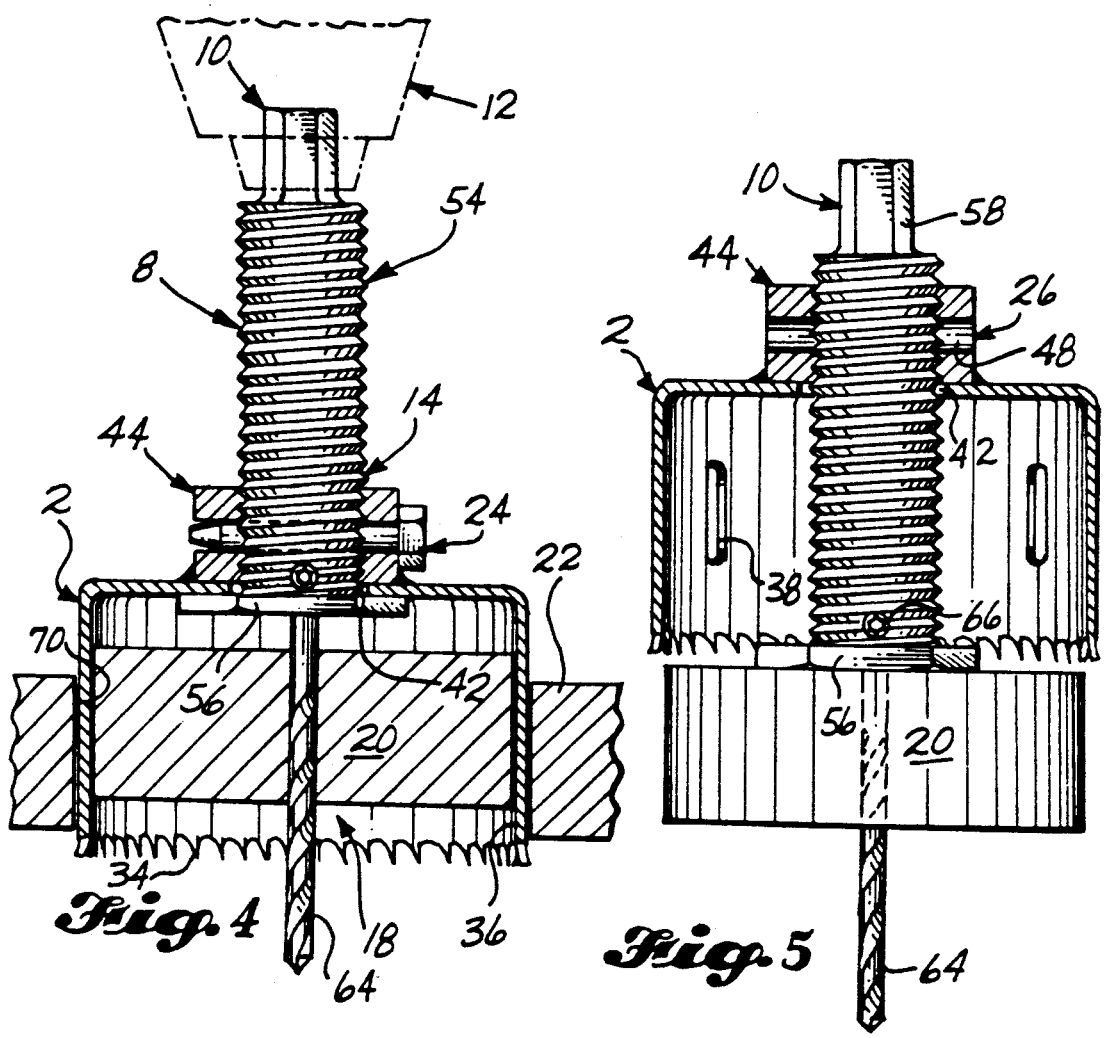

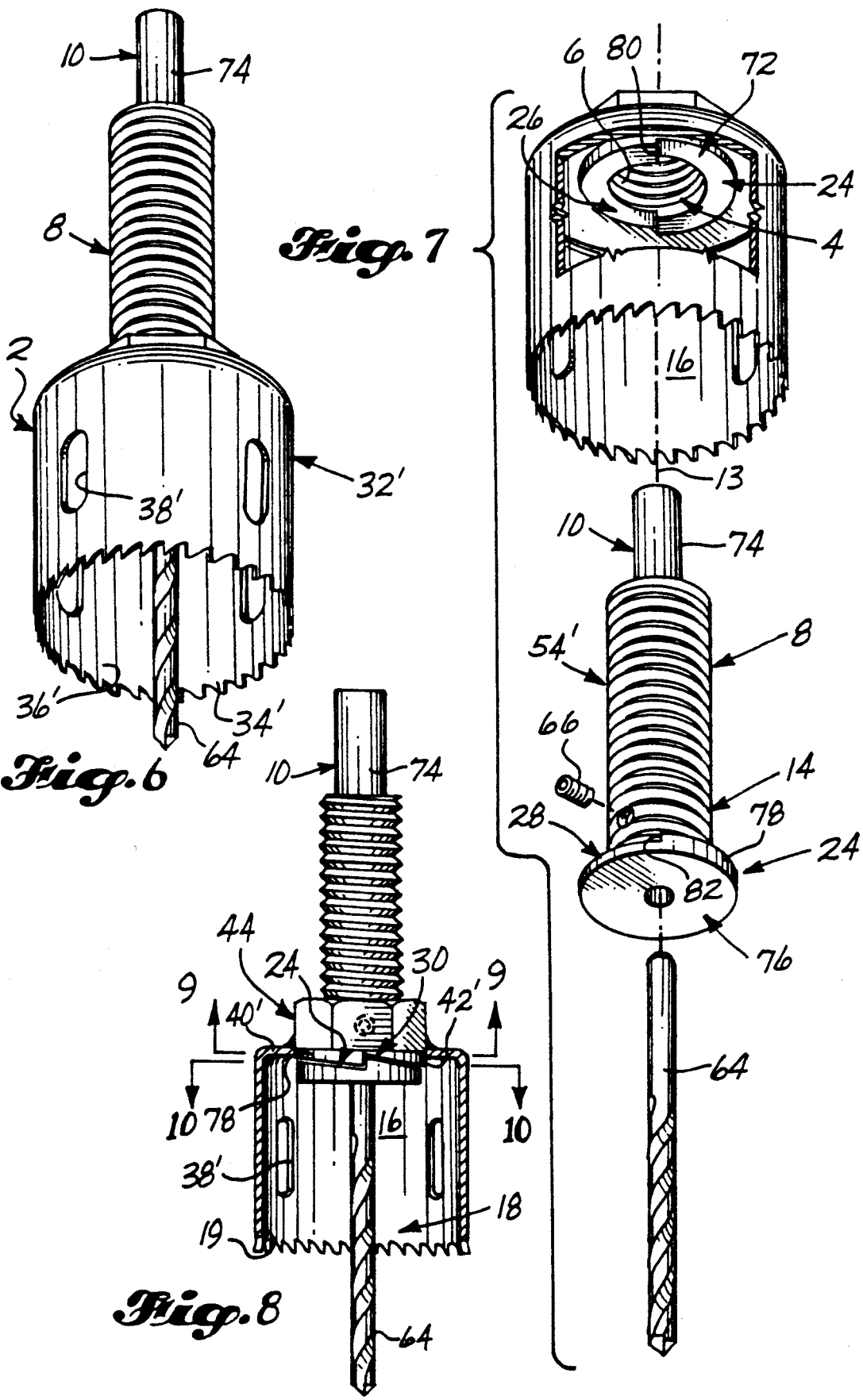

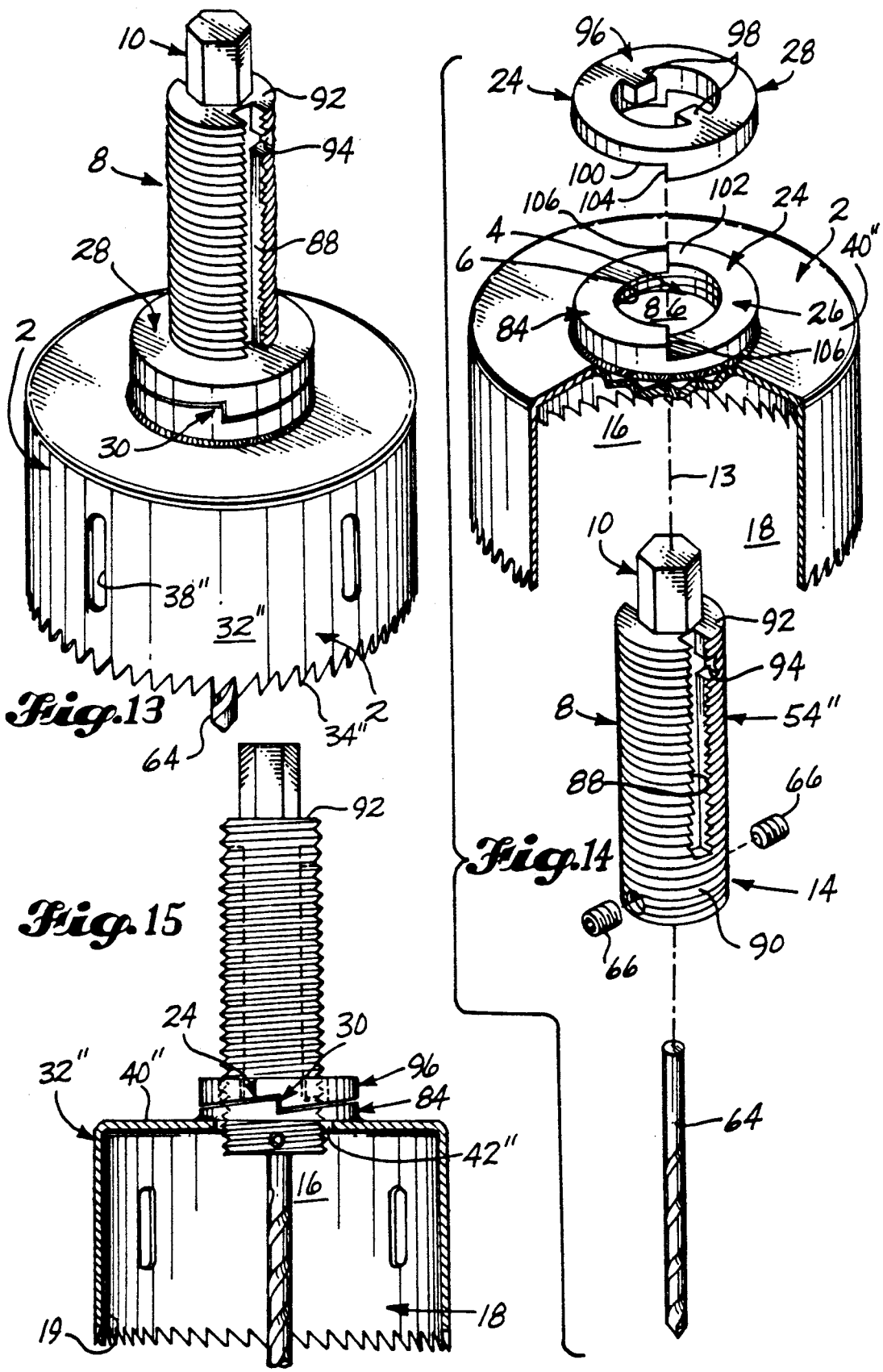

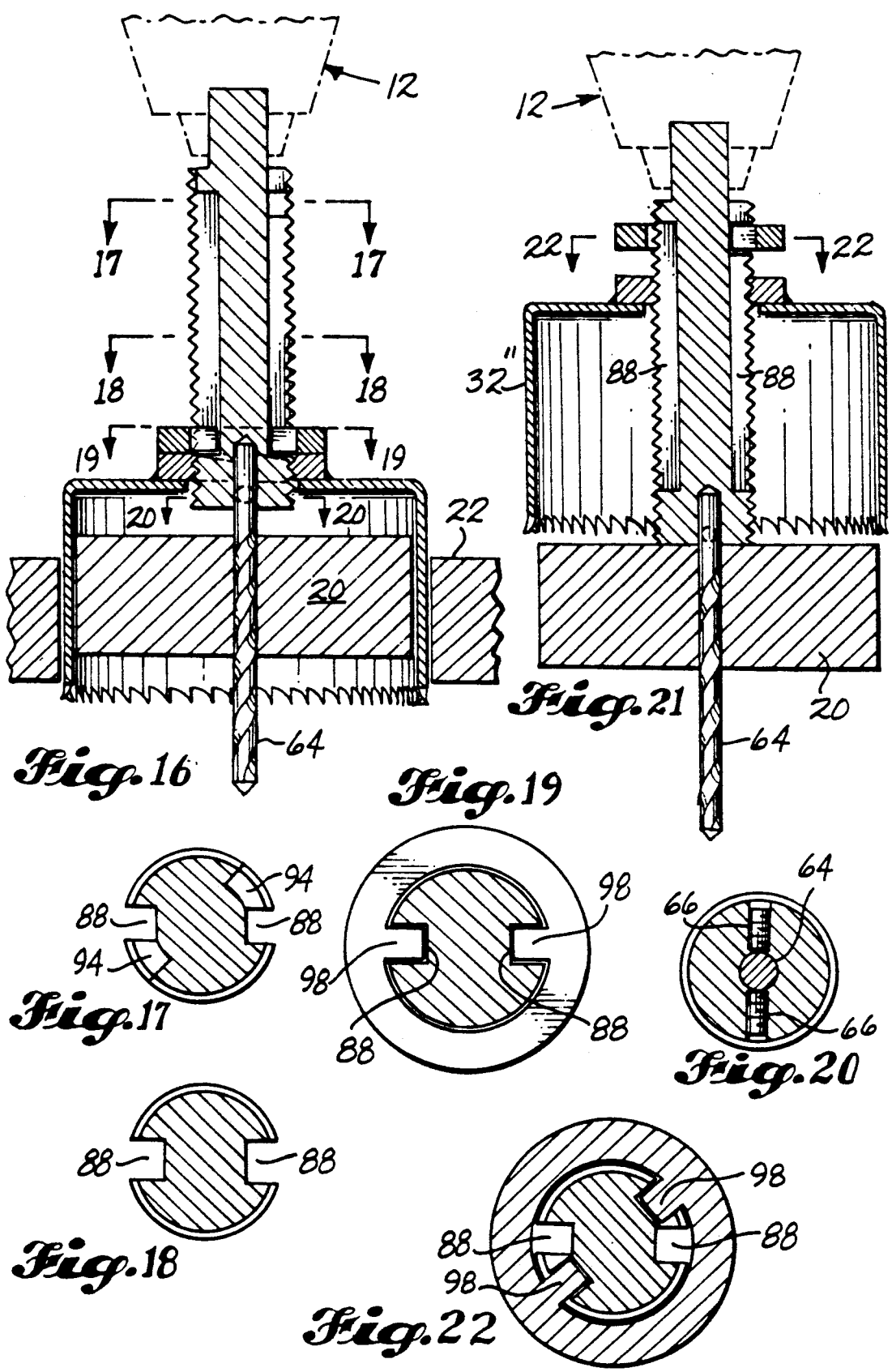

CORE-DRILLING APPARATUS WITH MANDREL DRIVER-EJECTOR

This is a continuation of application 07/248,169 which is now abandoned.

TECHNICAL FIELD

This invention relates to a core-drilling apparatus, and in particular, to a core-drilling apparatus wherein the mandrel-forming member of the same operates not only as a servo-driver for rotating the drill-forming member in the drilling operation, but also as a plunger for ejecting the core of work material from the drill-forming member when the drilling operation has been completed.

BACKGROUND ART

Several core-drilling apparatus are known in which the core of work material is ejected from the drill-forming member at the completion of the drilling operation with the use of a member which is additional to the mandrel and drill-forming members themselves. In U.S. Pat. No. 2,433,058, for example, a knurled collar is grasped to form a plunger which ejects the core of work material from the drill-forming member when the member is retracted over the plunger. In U.S. Pat. No. 2,923,180 and 2,414,133, a spring-loaded member is held in a retracted position until the completion of the drilling operation, and then is used to eject the core of work-material, the drill-forming member. In U.S. Pat. No. 3,978,733, the core of work material is ejected with a hydraulic jack. In U.S. Pat. No. 4,657,445, the core of work material is removed through the top end of the drill.

DISCLOSURE OF THE INVENTION

In the core-drilling apparatus of the present invention, the same mandrel-forming member which operates as a servo-driver to rotate the drill-forming member in the drilling operation, operates as a plunger at the close of the operation to eject the core of work material from the drill-forming member. According to the invention, the core-drilling apparatus comprises an open-ended hollow cylindrical drill-forming member having cylindrically axially extending screw thread in the operatively proximal end opening thereof; and an elongated mandrel-forming member having means on the operatively proximal end portion thereof whereby the latter member can be supported in linear projection from rotary drive means and rotated about its longitudinal axis on the line of projection, as well as longitudinally axially extending screw thread on the operatively distal end portion thereof which is cooperatively engageable with the screw thread in the proximal end opening of the drill-forming member so that the members are threadedly engageable with one another when the mandrel-forming member is relatively coaxially inserted into the hollow of the drill-forming member. The operatively distal end of the drill-forming member has a cylindrically axially extending recess within the end opening thereof, which is adapted to receive a core of material from the work when the drill-forming member is rotated cylindrically axially into the work during the drilling operation; and the apparatus further comprises connector means whereby the mandrel and drill-forming members can be alternately coupled and uncoupled to and from one another for purposes of rotating the drill-forming member during the drilling operation, and ejecting the core of work material from the same at the completion of the operation. The connector means include a pair of male/female latch elements which are operatively disposed on the members and reciprocable in relation to one another, axially of the members, to align with one another in one plane transverse the cylindrical and longitudinal axes of the members when the members are threadedly coaxially engaged with one another. The connector means also include means whereby when the latch elements are aligned with one another, they are interengageable with one another in the aforesaid one transverse plane of the members to lock the members against relative rotation for the drilling operation, and disengageable from one another thereafter to unlock the members for relative rotation, so that when the drill-forming member is secured against rotation and the mandrel-forming member is rotated in relation to it about the respective cylindrical and longitudinal axes of the members, the mandrel-forming member operates to eject the core of work material from the recess.

In certain of the presently preferred embodiments of the invention, the latch elements are disposed in operatively radially opposing sections of the members, and the sections are reciprocable in relation to one another, axially of the members, to align the latch elements with one another in one radius of the members when the members are threadedly coaxially engaged with one another. Moreover, the male latch element is radially advanceable into engagement with the female latch element when the elements are radially aligned with one another, and alternatively, radially retractable from the female latch element to disengage from the same when the drill-forming member is secured against rotation and the mandrel-forming member is rotated in relation to it. In some embodiments, for example, the radially opposing sections of the members take the form of relatively rotatable body portions of the same which have pin and hole-forming means on the radially opposing faces thereof. The pin-forming means are relatively radially advanceable into engagement with the hole-forming means when the respective pin and hole-forming means are aligned with one another in the aforesaid one radius of the members, and alternatively, radially retractable from the hole-forming means to disengage from the same when the drill-forming member is secured against rotation and the mandrel-forming member is rotated in relation to it. In fact, in one group of embodiments, the body portions of the members are flanged and have holes therethrough which register with one another when the flanges abut one another in the threadedly engaged condition of the members. The pin-forming means take the form of a pin which is manually retractably impaleable through the members at the holes.

In certain other presently preferred embodiments of the invention, the latch elements are disposed on operatively axially opposing sections of the members, and the sections are reciprocable in relation to one another, axially of the members, to align the latch elements with one another in one axial plane of the members when the members are threadedly coaxially engaged with one another. The male latch element is axially advanceable into engagement with the female latch element when the elements are axially aligned with one another, and alternatively, axially retractable from the female latch element to disengage from the same when the drill-forming member is secured against rotation and the mandrel-forming member is rotated in relation to it.

In some of these latter embodiments, the axially opposing sections of the members take the form of relatively rotatable flange portions of the same which have lug and slot-forming means on the axially opposing faces thereof. The lug-forming means are relatively axially advanceable into engagement with the slot-forming means when the respective lug and slot-forming means are aligned with one another in the aforesaid one axial plane of the members, and alternatively, axially retractable from the slot-forming means to disengage from the same when the drill-forming member is secured against rotation and the mandrel-forming member is rotated in relation to it. In one group of the latter embodiments, the flange portions of the members are helically surfaced at the axially opposing faces thereof, and the surfaces terminate in axial steps that are disposed radially of the respective members to mate with one another when the faces of the flange portions abut one another in the threadedly engaged condition of the members.

In certain of this latter group of embodiments, the flange portions of the members are axially disposed in the hollow of the drill-forming member. In fact, in some of them, the flange portion of the mandrel-forming member is fixed on the same to eject the core of work material from the recess when the drill-forming member is secured against rotation and the mandrel-forming member is rotated in relation to it.

In certain other embodiments of this latter group, the flange portions of the members are axially disposed outside of the hollow of the drill-forming member. In fact, in certain of them, the flange portion of the mandrel-forming member is shiftable in the one axial plane of the members to relatively advance and retract the lug-forming means into and from engagement with the slot-forming means when the lug and slot-forming means are aligned with one another in the one axial plane. The flange portion of the mandrel-forming member may also be shiftable rotationally of the members to align the lug and slot-forming means with one another in the aforesaid one axial plane of the members. For example, in some embodiments, the apparatus further comprises means whereby the flange portion of the mandrel-forming member is releaseably detainable at a site rotationally offset from the one axial plane of the members when the lug and slot-forming means are disengaged from one another.

In those embodiments of the invention wherein the latch elements are disposed on flange portions of the members, the flange portions may be fixed on the respective members and the latch elements may be helically structured to mate with one another when the axially opposing faces of the flange portions abut one another in the threadedly engaged condition of the members. Or one of the flange portions may be telescopically engaged on the corresponding member and slidably keyed to the same so that the latch elements mate with one another when the axially opposing faces of the flange portions abut one another in the threadedly engaged condition of the members. For example, in the latter case, the flange portion of the mandrel-forming member may take the form of a collar which is telescopically engaged on an axially extending shaft portion of the mandrel-forming member and keyed to an axially extending keyway in the same, there being, if desired, a part-circumferential groove in the shaft portion of the mandrel-forming member which interconnects with the keyway at a site remote from the flange portion of the drill-forming member when the latch elements are disengaged with one another, so that the collar can be releaseably detained in the groove during the ejection operation.

Typically, the mandrel-forming member comprises an elongated shaft which is threaded the entire length thereof, but has an unthreaded tenon on the proximal end thereof, to provide means whereby the shaft can be supported in linear projection from rotary drive means and rotated about its longitudinal axis on the line of projection.

Typically, the drill-forming member comprises a cup-shaped head which has a sawtoothed rim about the distal end opening thereof.

BRIEF DESCRIPTION OF THE DRAWINGS

These features will be better understood by reference to the accompanying drawings wherein several presently preferred embodiments of the invention are illustrated.

In the drawings:

FIG. 1 is a perspective view of a first embodiment wherein the mandrel and drill-forming members are pinned together for the drilling operation;

FIG. 2 is an exploded view of the first embodiment

FIG. 3 is a part-longitudinal cross-sectional view of the first embodiment when the members are pinned together for the drilling operation;

FIG. 4 is a similar view of the first embodiment at the completion of the drilling operation;

FIG. 5 is another such view of the first embodiment at the completion of the ejection operation;

FIG. 6 is a perspective view of a second embodiment of the invention wherein the members are mated together during the drilling operation;

FIG. 7 is an exploded view of the second embodiment;

FIG. 8 is a part-longitudinal cross-sectional view of the same when the members are mated together for the drilling operation;

FIG. 13 is a perspective view of a third embodiment of the invention wherein the members are collared together during the drilling operation;

FIG. 14 is an exploded view of the third embodiment;

FIG. 15 is a part-longitudinal cross-sectional view of the third embodiment when the members are collared together for the drilling operation;

FIG. 16 is another such view of the third embodiment at the completion of the drilling operation;

FIG. 17 is a cross-sectional view of the third embodiment along the line 17—17 of FIG. 16;

FIG. 18 is a cross-sectional view of the third embodiment along the line 18—18 of FIG. 16;

FIG. 19 is a cross-sectional view along the line 19—19 of FIG. 16;

FIG. 20 is a cross-sectional view along the line 20—20 of FIG. 16;

FIG. 21 is a part-longitudinal cross-sectional view of the third embodiment at the completion of the ejection operation;

FIG. 22 is a cross-sectional view of the third embodiment along the line 22—22 of FIG. 21.

BEST MODE FOR CARRYING OUT THE INVENTION

Figure 9:
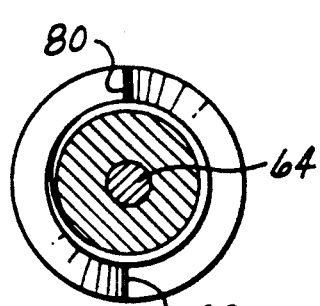
FIG. 9 is a cross-sectional view of the second embodiment along the line 9—9 of FIG. 8.
Figure 10:
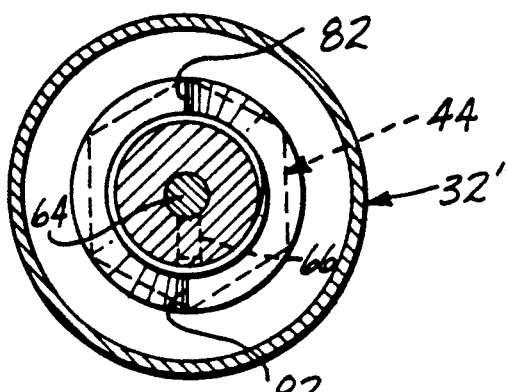
FIG. 10 is a cross-sectional view of the second embodiment along the line 10—10 of FIG. 8.
Figure 11:
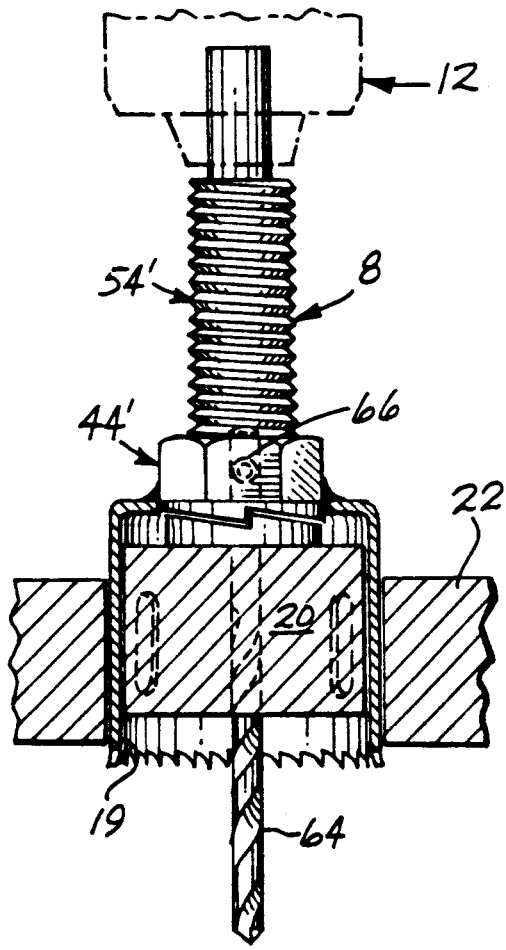
FIG. 11 is a part-longitudinal cross-sectional view of the second embodiment at the completion of the drilling operation.

Referring to the drawings, it will be seen that the core drilling apparatus of each embodiment comprises an open-ended hollow cylindrical drill-forming member 2 having cylindrically axially extending screw thread 4 in the operatively proximal end opening 6 thereof. The apparatus also comprises an elongated mandrel-forming member 8 having means 10 on the operatively proximal end portion thereof whereby the latter member can be supported in linear projection from rotary drive means 12 (FIG. 4) and rotated about its longitudinal axis 13 on the line of projection; as well as longitudinally axially extending screw thread 14 on the operatively distal end portion thereof which is cooperatively engageable with the screw thread 4 in the proximal end opening 6 of the drill-forming member so that the members are threadedly engageable with one another when the mandrel-forming member 8 is relatively coaxially inserted into the hollow 16 of the drill-forming member 2. Meanwhile, the operatively distal end of the drill-forming member 2 has a cylindrically axially extending recess 18 within the end opening 19 thereof, which is adapted to receive a core 20 of material from the work 22 when the drill-forming member 2 is rotated cylindrically axially into the work during the drilling operation.

The apparatus of each embodiment further comprises connector means 24 whereby the mandrel and drill-forming members 8 and 2 can be alternately coupled and uncoupled to and from one another for purposes of rotating the drill-forming member 2 during the drilling operation, and ejecting the core 20 of work material from the drill-forming member 2 at the completion of the operation. Toward this end, the connector means 24 include a pair of male/female latch elements 26 and 28 which are operatively disposed on the members and reciprocable in relation to one another, axially of the members, to align with one another in one plane transverse the cylindrical and longitudinal axes 13 of the members when the members are threadedly coaxially engaged with one another. The connector means 24 also include means 30 whereby when the latch elements 26 and 28 are aligned with one another, they are interengageable with one another in the aforesaid one transverse plane of the members to lock the members against relative rotation for the drilling operation, and disengageable from one another thereafter to unlock the members for relative rotation, so that when the drill-forming member 2 is secured against rotation and the mandrel-forming member 8 is rotated in relation to it about the respective cylindrical and longitudinal axes of the members, the mandrel-forming member operates to eject the core 20 of work material from the recess 18.

More particularly, the drill-forming member 2 in FIGS. 1-5 comprises a cup-shaped head 32 which has a saw-toothed rim 34 about the distal end opening 36 thereof, as well as slot-like openings 38 in the side walls thereof. The openings 38 serve as heat dissipating vents for the head. Meanwhile, the proximal end 40 of the head has a central opening 42 (FIG. 4) therein, and there is an annular hexagonal boss 44 welded coaxially about the opening 42 at the outside of the head. The inner periphery 46 of the boss has cylindrically axially extending screw thread 4 thereabout, and the diameter of the thread is slightly smaller than that of the opening 42 in the end 40 of the head. The boss 44 also has diametrically opposing holes 48 in the same, and the holes 48 are adapted to slidably receive a pin 50 that is flanged at the relatively outside end 52 thereof, and sufficiently long to be manually retractably impalable through the boss 44 at the holes 48.

The mandrel-forming member 8 comprises an elongated shaft 54 which is threaded over the entire length thereof, but has a hexagonal flange 56 at the distal end thereof, and a hexagonal tenon 58 on the proximal end thereof. The tenon 58 provides means 10 whereby the shaft 54 can be supported in linear projection from the rotary drive means 12 and rotated about its longitudinal axis on the line of projection. The shaft 54 also has a diametral hole 60 through the body of the same, which is spaced apart from the flange 56 and angularly oriented so that the hole 60 registers with the holes 48 in the boss 44 when the members are threadedly engaged with one another as shown and the flange 56 abuts the top 40 of the recess 18 in the head 32 of the drill-forming member 2, that is, the transition between the portions 46 and 18 of the hole 16 through the drill-forming member.

The shaft 54 of the mandrel-forming member 8 also has a hole 62 in the distal end 56 thereof, coincident with the axis 13 of the same, to receive a pilot drill 64 for the drilling operation. Set screws 66 are employed in diametrically opposing holes 68 of the shaft 54, to secure the drill against rotation relative to the shaft.

When the apparatus is put to use, the shaft 54 of the mandrel-forming member 8 is inserted in the hollow 16 of the head 32 of the drill-forming member 2, at the recess 18, and threadedly coaxially engaged in the boss 44 of the member 2 until the flange 56 abuts the top 40 of the recess. As indicated, this brings the hole 60 of the shaft 54 into radial alignment with the holes 48 of the boss 44. When the mandrel-forming member 8 is to be employed thereafter as a servo-driver for the drill-forming member 2, the pin 50 in impaled through the respective members at the holes 48, 60 of the boss and the shaft to interlock the members with one another for conjoint rotation. Then, in conventional fashion, the pilot drill 64 is centered on the work 22 and the drilling operation is conducted, with the effect that a core 20 of the work material is received within the recess 18 of the drill-forming member, as seen in FIG. 4. When the drilling operation is completed, such as when a hole 70 has been made in the work, the pin 50 is retracted from the holes 48, 60 to free the mandrel-forming member 8 for rotation in relation to the drill-forming member 2, and vice versa. Then, while the drill-forming member 2 is restrained against rotation, the mandrel-forming member 8 is rotated in relation to it, to employ the latter member as a plunger for ejection of the core 20 from the recess 18 in the manner of FIG. 5.

Figure 12:
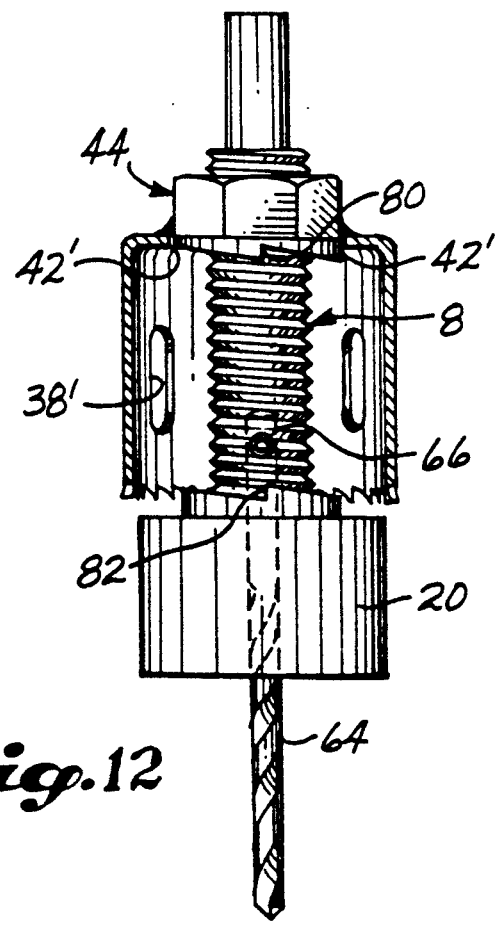
FIG. 12 is a similar view of the second embodiment at the completion of the ejection operation.

The mandrel-forming member 8 is rotated, of course, in one direction for its servo-driver function, and in the opposite direction for its function as a plunger or core ejector, the latter being the reverse of that used in threadedly engaging the mandrel-forming member with the drill-forming member 2. The embodiment in FIGS. 6-12 capitalizes on this forward and reverse rotation to simply mate the members together for the drilling operation. Once again, the head 32' of the drill-forming member 2 has a cup-shaped body with a saw-toothed rim 34' about the distal end opening 36' thereof, as well as lateral vent holes 38' and a boss 44' welded to the proximal end 40' thereof, coaxial with a central opening 42' in that end. In this instance, however, the opening 42' is considerably larger, and an annular helically surfaced clutch plate 72 is secured to the dorsal or inside face of the boss 44', so as to project within the recess 18 at the opening 42'. The shaft 54 of the mandrel-like member 8 has a threaded periphery and a rounded tenon 74 on the proximal end thereof, but the flange 76 of the shaft has a helically surfaced face 78 on the side thereof opposing the plate; and the helical surfaces on the faces of the plate and the flange terminate in axial steps 80 and 82 that are disposed radially of the respective members to mate with one another when the faces abut one another in the threadedly engaged condition of the members. Accordingly, when the shaft 54' of the mandrel-forming member is rotated in the same direction as that employed in mating the members together, the head 32' of the drill-forming member is rotated in conjunction with the mandrel-forming member to accomplish the drilling operation. Subsequently, however, when the head 32' of the drill-forming member is secured against rotation and the shaft 54' of the mandrel-forming member is rotated in the opposite direction, the steps 80 and 82 of the members disengage from one another to unlock the members for relative rotation. Moreover as the rotation continues, the flange 76 of the shaft operates as a plunger to eject the core 20 of work material from the recess 18 of the drill-forming member, as seen in FIG. 12.

In FIGS. 13-22, the head 32" of the drill-forming member has a saw-toothed rim 34" and vent holes 38", but in lieu of the annular boss 44 or 44' employed in FIGS. 1-12, the head 32" has an annular clutch plate 84 upstanding on the proximal end 40" thereof, about the opening 42" therein. Moreover, the opening 86 in the plate itself has cylindrically axially extending screw thread 4 about the inner periphery thereof, which is cooperatively engageable with the screw thread 14 on the shaft 54" of the mandrel-forming member 8, to enable the mandrel and drill-forming members 8 and 2 to be threadedly engaged with one another. Meanwhile, the shaft 54" of the mandrel-forming member has a pair of diametrically opposing, axially extending slots 88 in the same, which commence in the distal end portion 90 of the member and ultimately open into the proximal end 92 thereof. The shaft 54" also has part circumferential grooves 94 in the same, which exit in a common direction of rotation from the slots 88, and at a common cross-sectional level thereof in the proximal end portion 92 of the shaft. An annular collar 96 is telescopically engaged about the body of the shaft, and the collar 96 has a pair of diametrically opposing lugs 98 on the inner periphery thereof, which slidably key with the slots 88 in the shaft, to restrain the collar to movement in a single axial plane of the members. In addition, the axially opposing faces of the collar 96 and plate 84 have helically inclined surfaces 100 and 102 thereon, which terminate in axial steps 104 and 106 that are disposed in the aforesaid one axial plane of the members to mate with one another when the faces of the collar and plate abut one another in the threadedly engaged condition of FIG. 15.

When the apparatus is put to use, the collar 86 is telescopically engaged about the shaft 54" of the mandrel-forming member 8, with the lugs 98 in the slots 88, and is lowered into mating engagement with the plate 84 on the head 32" of the drill-forming member 2. In this condition, the members 2 and 8 are interlocked with one another for conjoint rotation, and the mandrel-forming member 8 can serve as a servo-driver for the drill-forming member 2. Then, when the drilling operation is completed, the collar 86 can be manually lifted from engagement with the plate 84 and raised to the level of the grooves 94, where with a slight twist, the lugs 98 can be seated in the grooves, to releaseably detain the collar at a site remote from the plate. Thereafter, the drill-forming member 2 can be grasped in one hand, while the mandrel-forming member 8 is rotated in relation to it, to eject the core 20 of work material from the recess 18 of the apparatus.

Alternatively, the apparatus can be inverted so as to place the collar below the plate 84; whereupon the collar will disengage from the plate, and release the members for the ejection operation, without the necessity for manually separating them. In such a case, moreover, the slots 88 may be closed at the proximal end 92 of the mandrel-forming member, to enable the collar to be more readily retained on the same, during the ejection operation.

We claim:
1. In a core drilling apparatus to be equipped with a pilot drill in use,
   a mandrel body which is elongated and has opposed ends with one of said ends adapted to be rotatably coupled to a rotary drive means and a longitudinally extending externally threaded portion intermediate said distal ends and the other of said distal ends defining a driver surface and means for securing said pilot drill to said other end so that the pilot drill projects from said driver surface,
   a core drill body having an axis of rotation and opposed ends and a hole therethrough which is centered on the axis of rotation and opening at said opposing ends of the drill body, a first portion of the hole opening at one of said ends and having internal threads, and a second portion of the hole opening at the other of said ends of the drill body, a circular cutting edge provided at said other end about said other end opening, said second portion having a diameter which is radially enlarged relative to the first portion to enable the second portion of the hole to receive a core of work material cut by the cutting edge,
   the externally threaded portion of the mandrel body being threaded into the internally threaded first portion of the hole,
   latch means for providing a positive rotatable coupling between the bodies of the mandrel and the core drill for performing a cutting operation, and alternatively, releasing the positive rotatable coupling for permitting threaded movement of the mandrel body in the core drill body for ejection of the cut core from the hole, said latch means including a first and second abutment means each having a coupling surface extending along parallels to a plane coinciding with the longitudinal axis of the mandrel body, between points spaced apart from one another in the plane axially of the mandrel body, and an abutment surface extending in a plane transverse the longitudinal axis of the mandrel body at a point operatively offset from the coupling surface of the respective first or second abutment means axially of the mandrel body, means for rotatably coupling and axially fixing the first abutment means to one of the mandrel body and the core drill body, means mounting the second abutment means on the other of said mandrel body and said core drill body for axial movement on said other body between a first position in which the respective coupling surfaces and abutment surfaces of the first and second abutment means are aligned with one another and abutted with one another respectively, in planes coinciding with and transverse the axis of the mandrel body, respectively, and a second position in which the respective abutment surfaces of the first and second abutment means are operatively disengaged and spaced apart from one another axially of said other body, and means whereby the coupling surfaces of the first and second abutment means are interengageable with one another when the second abutment means are moved axially on said other body to the first position thereof, to positively couple the bodies of the mandrel and the core drill, and the respective first and second abutment means, for rotation in unison with one another about the longitudinal axis of the mandrel body for the cutting operation, and alternatively, disengageable from one another when the second abutment means are moved axially on said other body to the second position thereof, to permit the mandrel body to be threadedly moved in the core drill body for the ejection operation, the driver surface being recessed in the second portion of the hole, relative to said other end of the core drill body, when the second abutment means are in the first position thereof, and the length of said threaded portion and the distance between said first and second positions of the second abutment means being of sufficient lengths to enable the mandrel body to be threadedly moved in the core drill body to an ejection position in which the driver surface is substantially coplanar with a plane defined by said cutting edge when the second abutment means are moved axially on said other body to the second position thereof.

2. The core drilling apparatus according to claim 1 wherein one of the first and second abutment means has a socket therein whose center line is disposed in a plane coinciding with the longitudinal axis of the mandrel body, and the other of the first and second abutment means has a pin thereon whose center line is disposed in a plane coinciding with the longitudinal axis of the mandrel body, and wherein the pin and socket are retractably interengageable with one another at the outer and inner peripheral surfaces thereof, respectively, when the second abutment means are moved axially on said other body to the first position thereof.

3. The core drilling apparatus according to claim 2 wherein the pin and socket extend along radii of the mandrel body axis at the center lines thereof, and are retractably interengageable with one another when the radii coincide with one another.

4. The core drilling apparatus according to claim 2 wherein the first and second abutment means have annular faces thereon which are relatively opposed to one another radially of the mandrel body axis when the second abutment means are moved axially on said other body, and wherein the socket is recessed in one of the first and second abutment means to extend along a radius of the mandrel body axis at the center line thereof, and the pin is operatively reciprocably engaged in the other of the first and second abutment means to be retractably inserted into the socket along the aforesaid radius of the mandrel body axis when the second abutment means are moved axially on said other body to the first position thereof.

5. The core drilling apparatus according to claim 1 wherein the first and second abutment means are disposed on the bodies of the core drill and the mandrel, respectively, adjacent the transition between the first and second portions of the hole through the core drill body, and the other end of the mandrel body, respectively, and wherein the first and second abutment means also have annular faces thereon which are relatively opposed to one another lengthwise of the mandrel body axis when the second abutment means are moved axially on the mandrel body, and are operable to abut one another when the second abutment means are moved axially on the mandrel body to the first position thereof.

6. The core drilling apparatus according to claim 1 wherein the first and second abutment means have annular faces thereon which are relatively opposed to one another lengthwise of the mandrel body axis when the second abutment means are moved axially on said other body, and are operable to abut one another when the second abutment means are moved axially on said other body to the first position thereof, and wherein the annular faces of the first and second abutment means have said coupling surfaces thereon and said coupling surfaces extend respectively between axially spaced apart points of a plane coinciding with the longitudinal axis of the mandrel body, and are relatively raised on and recessed in the respective faces to be retractably interengageable with one another when the second abutment means are moved axially on said other body to the first position thereof.

7. The core drilling apparatus according to claim 6 wherein the coupling surfaces extend along radii of the mandrel body axis and are retractably interengageable with one another when the radii coincide with one another.

8. The core drilling apparatus according to claim 1 wherein the second abutment means take the form of a flange on the body of the mandrel.

9. The core drilling apparatus according to claim 8 wherein the flange is engaged on the externally threaded portion of the mandrel body, to be shifted in relation to the mandrel body, axially thereof, and in relation to the core drill body at the one end thereof, and wherein the flange and the one end of the core drill body have annular faces thereon which are relatively opposed to one another lengthwise of the mandrel body axis when the flange is moved axially on the mandrel body, and are operable to abut one another when the flange is moved axially on the mandrel body to the first position thereof, and wherein the annular faces of the flange and the one end of the mandrel body have said coupling surfaces thereon and said coupling surfaces extend respectively between axially spaced apart points of a plane coinciding with the longitudinal axis of the mandrel body, and are relatively raised on and recessed in the respective faces to be retractably interengageable with one another when the flange is moved axially on the mandrel body to the first position thereof.

10. The core drilling apparatus according to claim 9 wherein the flange is telescopically engaged on the externally threaded portion of the mandrel body, to be slideably shifted in relation to the mandrel body, axially thereof, but keyed to the mandrel body to maintain a predetermined angular orientation about the mandrel body axis, and wherein the coupling surfaces extend along radii of the mandrel body axis and are retractably engaged with one another when the radii coincide with one another.

11. The core drilling apparatus according to claim 10 further comprising means for maintaining the flange in the second position thereof during threaded movement of the mandrel body in the core drill body.

12. The core drilling apparatus according to claim 6 wherein the flange is disposed on the other end of the mandrel body, to be shifted in relation to the core drill body at the transition between the first and second portions of the hole through the core drill body, and wherein the flange and the transition have annular faces thereon which are relatively opposed to one another lengthwise of the mandrel body axis when the flange is moved axially on the mandrel body, and are operable to abut one another when the flange is moved axially on the mandrel body to the first position thereof, and wherein the annular faces of the flange and the transition have said coupling surfaces thereon and said coupling surfaces extend respectively between axially spaced apart points of a plane coinciding with the longitudinal axis of the mandrel body, and are relatively raised on and recessed in the respective faces to be retractably interengageable with one another when the flange is moved axially on the mandrel body to the first position thereof, the faces of the flange and the transition being helical and the threading of the mandrel and the core drill bodies being adapted to abut the surfaces with one another when the faces of the flange and the transition abut one another.

13. A core drilling apparatus comprising:
a mandrel body which is elongated and has opposed ends with one of said ends adapted to be rotatably coupled to a rotary drive means and a longitudinally extending externally threaded portion intermediate said distal ends and the other of said distal ends defining a driver surface and a pilot drill means projecting from said driver surface, a core drill body having an axis of rotation and opposed ends and a hole therethrough which is centered on the axis of rotation and opening at said opposing ends of the drill body, a first portion of the hole opening at one of said ends and having internal threads, and a second portion of the hole opening at the other of said ends of the drill body, a circular cutting edge provided at said other end about said other end opening, said second portion having a diameter which is radially enlarged relative to the first portion to enable the second portion of the hole to receive a core of work material cut by the cutting edge, the externally threaded portion of the mandrel body being threaded into the internally threaded first portion of the hole, latch means for providing a positive rotatable coupling between the bodies of the mandrel and the core drill for performing a cutting operation, and alternatively, releasing the positive rotatable coupling for permitting threaded movement of the mandrel body in the core drill body for ejection of the cut core from the hole, said latch means including a first and second abutment means each having a coupling surface extending along parallel to a plane coinciding with the longitudinal axis of the mandrel body, between points spaced apart from one another in the plane axially of the mandrel body, and an abutment surface extending in a plane transverse the longitudinal axis of the mandrel body at a point operatively offset from the coupling surface of the respective first or second abutment means axially of the mandrel body, means for rotatably coupling and axially fixing the first abutment means to one of the mandrel body and the core drill body, means mounting the second abutment means on the other of said mandrel body and said core drill body for axial movement on said other body between a first position in which the respective coupling surfaces and abutment surfaces of the first and second abutment means are aligned with one another and abutted with one another respectively, in planes coinciding with and transverse the axis of the mandrel body, respectively, and a second position in which the respective abutment surfaces of the first and second abutment means are operatively disengaged and spaced apart from one another axially of said other body, means whereby the coupling surfaces of the first and second abutment means are interengageable with one another when the second abutment means are moved axially on said other body to the first position thereof, to positively couple the bodies of the mandrel and the core drill, and the respective first and second abutment means, for rotation in unison with one another about the longitudinal axis of the mandrel body for the cutting operation, and alteratively, disengageable from one another when the second abutment means are moved axially on said other body to the second position thereof, to permit the mandrel body to be threadedly moved in the core drill body for the ejection operation, the driver surface being released in the second portion of the hole, relative to said other end of the core drill body, when the second abutment means are in the first position thereof, and the length of said threaded portion and the distance between said first and second positions of the second abutment means being of sufficient lengths to enable the mandrel body to be threadedly moved in the core drill body to an ejection position in which the driver surface is substantially coplanar with a plane defined by said cutting edge when the second abutment means rae moved axially on said other body to the second position thereof.

* * * * *

UNITED STATES PATENT AND TRADEMARK OFFICE
CERTIFICATE OF CORRECTION

PATENT NO. : 5,082,403
DATED : January 21, 1992
INVENTOR(S) : James L. Sutton and Stephen Van Valkenburg It is certified that error appears in the above-identified patent and that said Letters Patent is hereby corrected as shown below:

Claim 13, column 12, line 47, the word "released" should be --recessed--.

Claim 13, column 12, line 58, the word "rae" should be --are--

Signed and Sealed this

Twenty-first Day of September, 1993

*Attest:*

BRUCE LEHMAN

*Attesting Officer*   Commissioner of Patents and Trademarks